(12) United States Patent
Koyanagi et al.

(10) Patent No.: US 8,277,910 B2
(45) Date of Patent: Oct. 2, 2012

(54) STRUCTURE OF FLUID CONTAINER AND METHOD AND APPARATUS FOR PRODUCING THE FLUID CONTAINER

(75) Inventors: Yoshihiro Koyanagi, Kashiwara (JP); Katsutoshi Yoshifusa, Lake Forest, CA (US); Kenneth Nakagawa, Lake Forest, CA (US)

(73) Assignee: AIR-PAQ, Inc., Irvine, CA (US)

( * ) Notice: Subject to any disclaimer, the term of this patent is extended or adjusted under 35 U.S.C. 154(b) by 0 days.

(21) Appl. No.: 10/610,501

(22) Filed: Jun. 28, 2003

(65) Prior Publication Data

US 2004/0265523 A1  Dec. 30, 2004

(51) Int. Cl.
*B32B 1/02* (2006.01)
*B32B 1/08* (2006.01)

(52) U.S. Cl. ............... 428/35.7; 428/34.1; 428/35.9; 428/36.9; 206/213.1; 206/461; 206/464

(58) Field of Classification Search ............... 428/34.1, 428/35.7, 35.9, 36.9; 206/213.1, 461, 484
See application file for complete search history.

(56) References Cited

U.S. PATENT DOCUMENTS

| | | | |
|---|---|---|---|
| 3,313,472 A | 4/1967 | Tjerneld et al. | |
| 3,806,025 A | 4/1974 | Marshall | |
| 4,708,167 A | 11/1987 | Koyanagi | |
| 4,850,912 A | 7/1989 | Koyanagi | |
| 5,026,339 A | 6/1991 | Kasper | |
| 5,209,264 A | 5/1993 | Koyanagi | |
| 5,308,163 A | 5/1994 | Abe | |
| 5,388,910 A | 2/1995 | Koyanagi | |
| 5,460,200 A | 10/1995 | Glicksman | |
| 5,469,966 A * | 11/1995 | Boyer | 206/522 |
| 5,540,500 A | 7/1996 | Tanaka | |
| 5,927,336 A | 7/1999 | Tanaka et al. | |
| 6,067,778 A * | 5/2000 | Yamamoto et al. | 53/451 |
| 6,508,270 B2 | 1/2003 | Koyanagi | |
| 6,729,473 B2 | 5/2004 | Anderson | |
| 6,827,099 B2 | 12/2004 | Tanaka et al. | |
| 7,165,677 B2 | 1/2007 | Tanaka et al. | |
| 2002/0064319 A1* | 5/2002 | Tanaka et al. | 383/3 |
| 2005/0229537 A1 | 10/2005 | Koyanagi | |
| 2005/0244527 A1 | 11/2005 | Koyanagi et al. | |
| 2007/0006443 A1 | 1/2007 | Koyanagi | |

* cited by examiner

*Primary Examiner* — Marc Patterson
(74) *Attorney, Agent, or Firm* — Finnegan, Henderson, Farabow, Garrett & Dunner LLP

(57) ABSTRACT

A fluid container for packing a product includes a check valve for each container member. A bonding structure of check-valves to a fluid container and a production apparatus of fluid container are disclosed in detail where the check valve is capable of reliably keeping the expansion of the fluid container without any fluid leakage after inflating the fluid container. As the check-valve is bonded to only one of thermoplastic container films, both films of the check-valve are fixed to one of the container films at a plurality of seal portions, thereby preventing the reverse flow by tightly closing the check valve. The plurality of seal portions in a flow pass of the fluid disrupt the fluid flow so as to add resistance to the fluid flow.

11 Claims, 14 Drawing Sheets

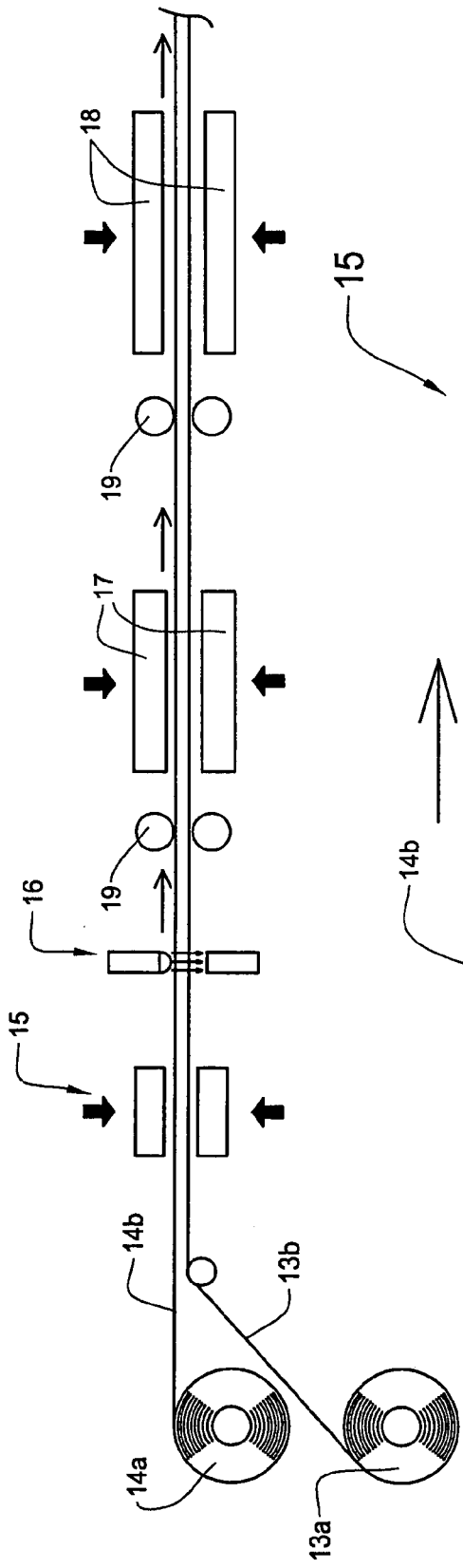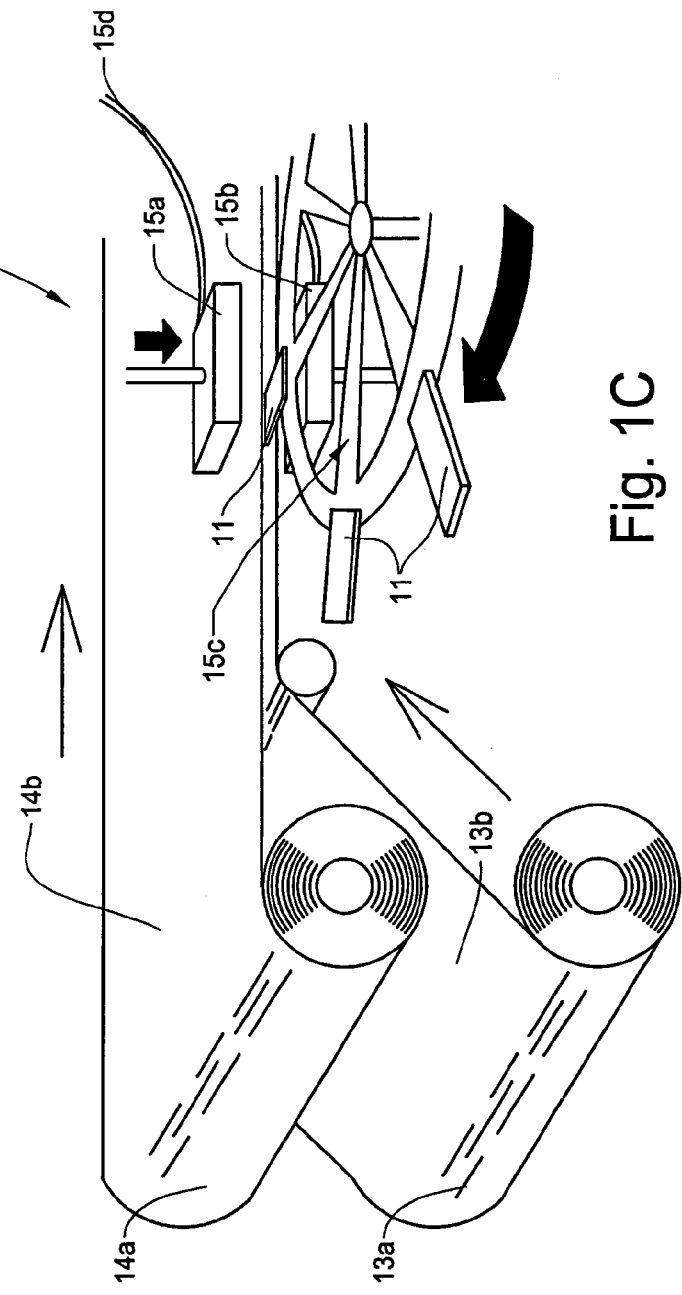

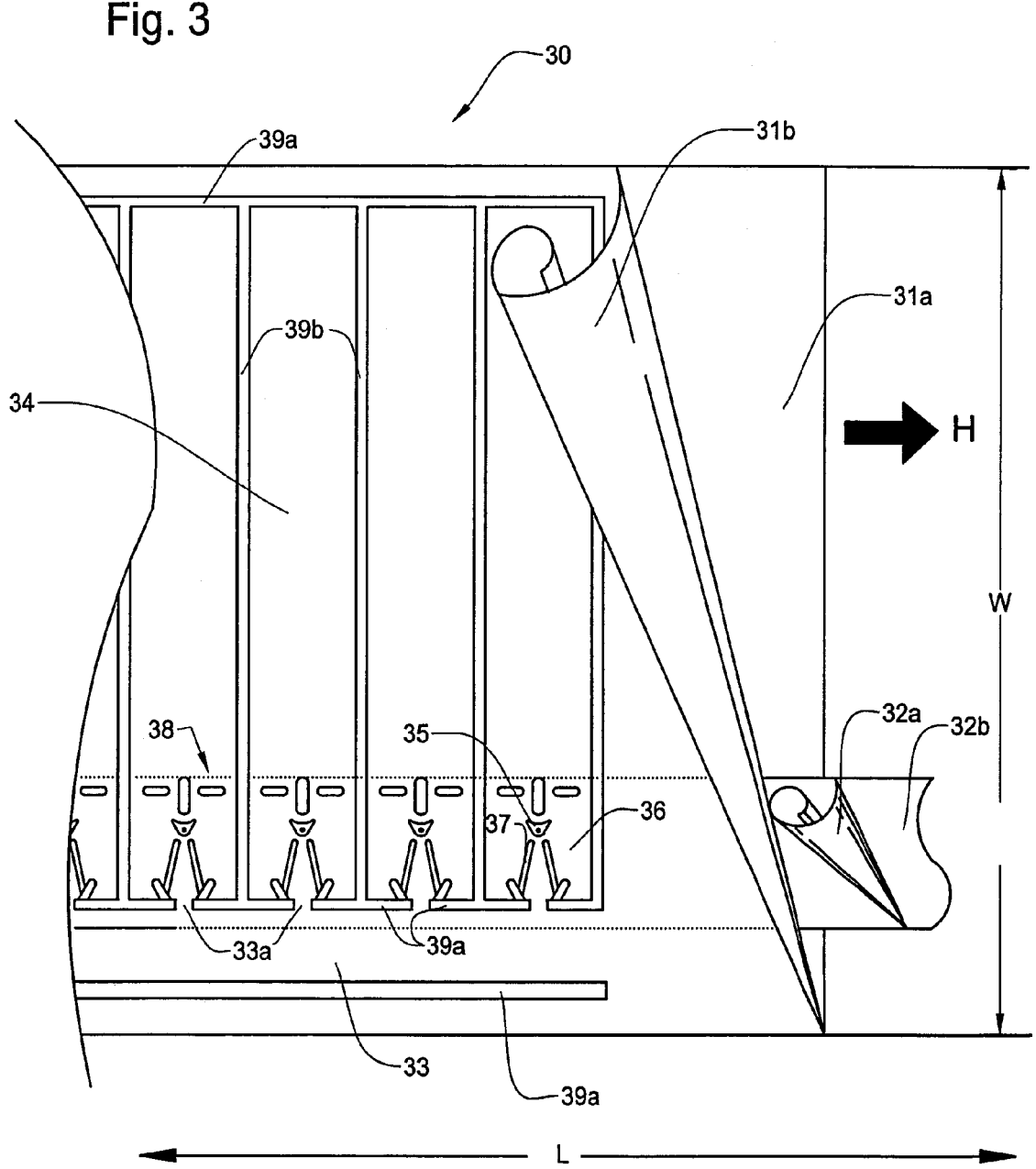

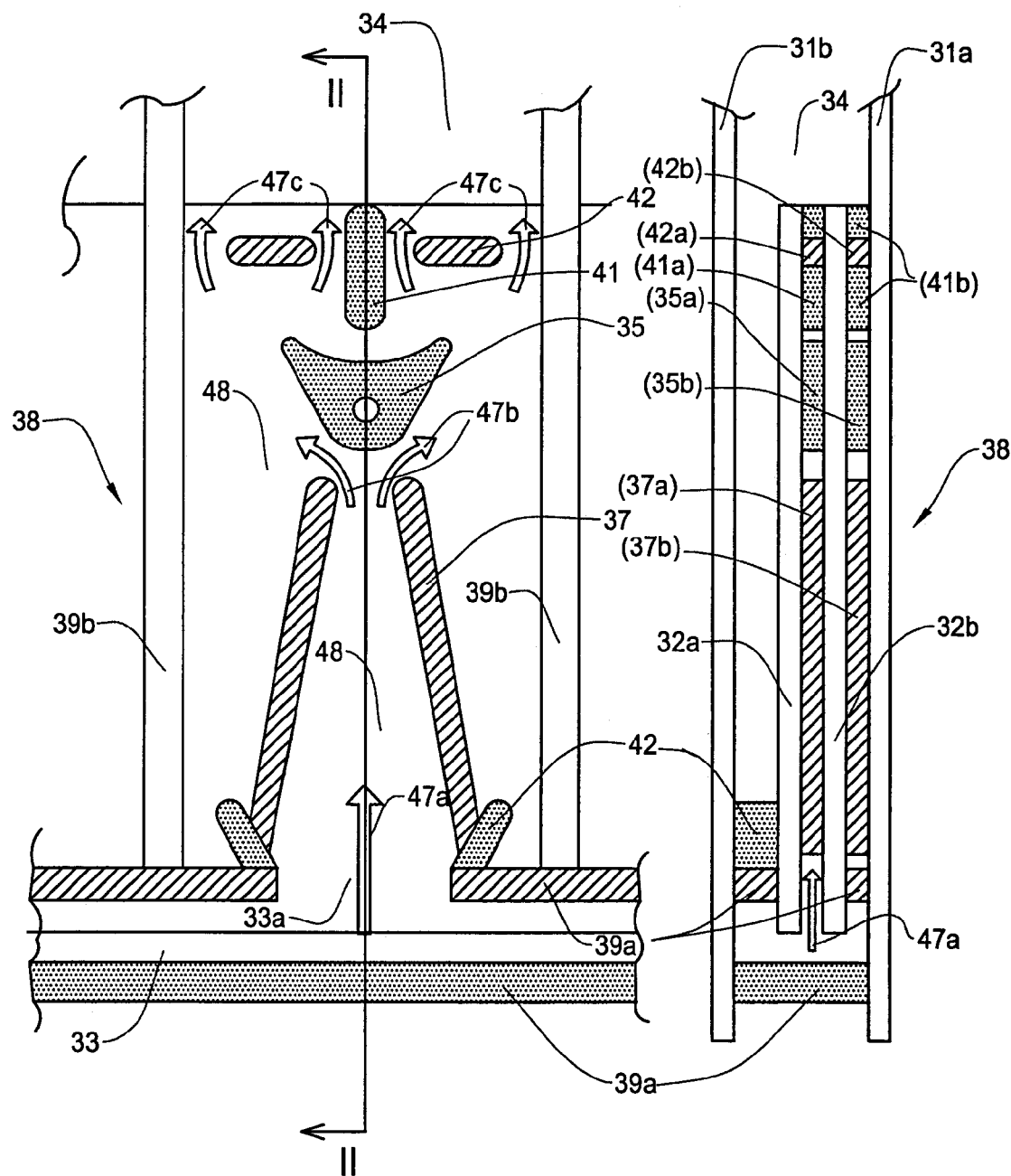

STRUCTURE OF FLUID CONTAINER AND METHOD AND APPARATUS FOR PRODUCING THE FLUID CONTAINER

FIELD OF THE INVENTION

This invention relates to a structure of a fluid container and a manufacturing apparatus for producing the fluid container, and more particularly, to a bonding structure of the check valve capable of reliably keeping the expansion of the fluid container without any fluid leakage after inflating the fluid container and to the production method and apparatus to produce the fluid container incorporating the bonding structure of the check valves.

BACKGROUND OF THE INVENTION

A styroform packing material has been used for a long time for packing commodity and industrial products. Although the styroform package material has a merit such as a good thermal insulation performance, it has also various disadvantages: recycling the styroform is not possible, soot is produced when it burns, a flake or chip comes off when it is snagged because of it's brittleness, an expensive mold is needed for its production, and a relatively large warehouse is necessary to store it.

Therefore, to solve such problems above, other packing materials and methods have been proposed. One method is a fluid container of sealingly containing a liquid or gas. The fluid container has excellent characteristics to solve the problems in the styroform. First, because the container is made of only thin sheets, it does not need a large warehouse to store it unless the container is inflated. Secondly, a mold is not necessary for its production because of its simple structure. Thirdly, the fluid container does not produce a chip or dust which has adverse effect on precision products. Also, recyclable materials can be used for the films of the fluid container. Further, the fluid container can be produced with low cost.

FIG. 1A shows an example of fluid container in the conventional technology. The fluid container 10a is composed of first and second thermoplastic films 13 and 14, respectively, and a check valve 11. Typically, each thermoplastic film is composed of three layers of materials: polyethylene, nylon and polyethylene which are bonded together with appropriate adhesive. The first and second thermoplastic films are heat-sealed together around rectangular seal portions 12a, 12b after the check valve is attached. Thus, one container bag 10a sealed with the heat seal portions 12a, 12b is formed such as shown in FIG. 1A.

FIG. 1B shows an example of the manufacturing apparatus for the fluid container, including first and second plastic film stocks 13a and 14a respectively, a first heat seal device for attaching a check valve 11, a sensor device 16 to control for supplying elongated plastic films 13c and 14c, a second heat seal device 17 for right-left heat seal portions 12a, a third heat seal device 18 for upper-lower heat seal portions 12b, and film feed rollers 19.

Materials for the first and second plastic films are supplied as elongated plastic films 13b and 14b from the rolled film stocks 13a and 14a such as shown in FIG. 1B or FIG. 1C. The sensor device 16 is used to drive the feed rollers 19 and to control a feeding speed of the plastic films by, for example, by sensing marks printed on the elongated plastic film 13b or 14b.

FIG. 1C shows an example of the first heat seal device 15, including upper and lower heat seal elements 15a and 15b, a check valve supplier 15c, heater assemblies 15d and check valves 11. The check valves 11 are pre-installed on the check valve supplier 15c. After the elongated films 13b, 14b for one container package are supplied, the check valve supplier 15c supplies the check valve 11 between the first and second elongated films 13b and 14b by rotating about its axis. The heater assemblies 15d are embedded in both the heat seal elements 15a-15b and maintain the surfaces to contact the films 13b and 14b at an appropriate fusing temperature of the plastic film. By sandwiching the check valve 11 between the upper and lower heat seal elements 15a and 15b, the check valve 11 is fused together with both the first and the second plastic films 13b, 14b and attached at a predetermined position of the fluid container.

Referring back to FIG. 1B, after installation of the check valve 11 at the stage of the first heat seal device 15, the elongated plastic films 13b, 14b are fused together to form the right-left heat seal portions 12a of the fluid container at the stage of the second heat seal device 17. Finally, the films 13b, 14b are fused together to form the upper-lower portions 12b at the stage of the third heat seal device 18, and the fluid container with one check valve shown in FIG. 1 is produced.

FIGS. 2A-2B show an example of a fluid container lob with multiple container members where each container member is provided with a check valve. A main purpose of having multiple container members is to increase the reliability. Namely, even if one of the container members causes an air leakage for some reason, the fluid container can still function as a cushion of package because other container members are intact. Thus, in order to achieve this purpose, each container member has an independent room which is inflated independently.

With reference to FIG. 2A, this fluid container 10b is made of the first and second thermoplastic films which are bonded together around a rectangular periphery 23a and further bonded together at each boundary of two container members 22 so that a guide passage 21 and container members 22 are created. When the first and second thermoplastic container films are bonded together, as shown in FIG. 2A, the check valves 11 are also attached to each inlet port of the container member 22. By attaching the check valves 11, each container member 22 becomes independent from the other. The inlet port 24 of the fluid container 10b is used when filling a fluid (typically an air) to each container member 22 by using, for example, an air compressor.

FIG. 2B shows an example of the fluid container 10b with multiple check valves when it is filled with the fluid. First, each container member 22 is filled with the fluid from the inlet port 24 through the guide passage 21 and the check valve 11. To avoid a rupture of the container members by variations in the environmental temperature, the fluid into the container is typically stopped when the container member 22 is inflated at about 90% of its full expansion rate. After filling the fluid, the expansion of each container member is maintained because each check-valve 11 prevents the reverse flow. Typically, the air compressor has a gage to monitor the supplied air pressure, and automatically stops supplying the air to the fluid container lob when the pressure reaches a predetermined value.

The check valve 11 is typically made of two rectangular thermoplastic valve films which are bonded together to form a fluid pipe. The fluid pipe has a tip opening and a valve body to allow a fluid flowing through the fluid pipe from the tip opening but to disallow the reverse flow through the valve body. More details of the check-valve example are described in the U.S. Pat. Nos. 5,209,264, 4,708,167 and 5,927,336. This type of check valve is produced before manufacturing the fluid container and attached to the fluid container as shown in FIG. 1C. Therefore, this type of check valve is often called an out-line valve. On the other hand, a valve which is produced in the process of making a fluid container, is called an in-line valve. Preferably, the present invention is applied to the in-line valve, although the present invention is also applicable to the out-line valve.

Fluid containers are becoming more and more popular. However, there are problems to solve, for example, when the fluid container 10b is inflated, both sides 23a and 23b of the check valve body is shifted inwardly by the expansion of the container member 22. The directions of the shift is shown by arrows 25 in FIG. 2C. As a result, the check valves 11 become wavy as shown in FIG. 2D although the bonded portion was straight before the fluid container 10b is inflated.

As mentioned above, the check valve 11 is typically made of two thermoplastic films. It should be noted that sometimes by the pressure noted above, a gap is created between the thermoplastic films 11a and the check-valve 11 of the container member 22. Thus, the fluid is leaked through the gap as shown in FIG. 2E. The leakage of the check valve 11a is shown by an arrow 27. In other words, the reverse flow in the container member corresponding to the check valve 11a occurs and the fluid from the container member 22 flows into the guide passage 21 in this example. This is a serious problem of the fluid containers in the conventional technology. As long as there is no gap between the two thermoplastic films, the reverse flow is prevented as shown in the wavy check valves 11b and 11c of FIG. 2E.

There is another problem which is involved in the production of the fluid containers. This problem is related to the installation of the check valves: it is not easy to accurately attach the check valve to each container member of the fluid container film. Therefore, the inaccurate installation of the check valve also sometimes causes a leakage problem.

As described in the foregoing, the fluid container using the check valves is highly useful for packing commodity products and industrial products instead of the styroform packing. However, since there are leakage and other problems in the fluid containers as described above, it is necessary to improve the performance of check valves in the fluid container and the production efficiency for producing the fluid containers to reduce the overall cost.

SUMMARY OF THE INVENTION

It is, therefore, an object of the present invention to provide a structure of fluid container and a method and apparatus for producing the fluid containers with high efficiency and high reliability.

It is another objected of the present invention to provide a bonding structure of an in-line check-valve formed in fluid members of a fluid container, which is capable of reliably keeping the expansion of the fluid container without any fluid leakage after inflating the fluid container.

It is a further object of the present invention to provide a method and apparatus for producing the fluid container having the above bonding structure of the check-valve.

More specifically, one aspect of the present invention is a structure of the fluid container for sealingly containing a fluid and having a check valve of unique structure. The fluid container is comprised of first and second container films superposed with each other where predetermined portions of the first and second thermoplastic container films are bonded, thereby creating a plurality of container members, and a check valve established at an input of each container member between the first and second container films for allowing a fluid flow of only one predetermined direction, said check valve being formed of first and second check valve films juxtaposed with each other.

The check valve is bonded to one of the first or second container film for tightly closing the check valve when a reverse flow of the fluid is about to occur, thereby preventing the reverse flow. Accordingly, both two films of the check valve are curved in the same manner as one of the container film to which the check valve is bonded when the fluid container is inflated. Thus, the two bonded films of the check valve are tightly sealed and the expansion of the fluid container is reliably maintained after the fluid container is inflated.

Another aspect of the present invention is a method for producing the fluid container having the above noted structure. The method includes the steps of superposing first and second check valve films on a first container film, bonding the first and second check valve films to the first container film for creating a plurality of check valves, superposing a second container film on the first container film while sandwiching the check valves therebetween, and bonding the first container film, the first and second check valve films and the second container film, thereby creating a plurality of container members where the check valve is positioned at each input of the container member.

A further aspect of the present invention is an apparatus for producing the fluid container having the above noted structure. The production apparatus is comprised of means for feeding films which feeds a first container film, first and second check valve films and a second container film, wherein the first and second check valve films are sandwiched between the first and second container films, a feed sensor for detecting a position of a mark printed on either the first or second check valve film to feed the films, an up-down roller controller for adjusting positions of the first container film and the first and second check valve films, means for bonding the first container film and the first and second check valve films, thereby creating check valves, and means for bonding the first container film, the first and second container films and the second container film, thereby creating a plurality of container members and inlet portions of the check valves. The up-down controller adjusts the position of the check valve films by detecting the mark for determining the position of check valve.

According to the present invention, the structure of check valves to be bonded to the fluid container and the production apparatus for producing the fluid containers enable the fluid container of reliably keeping the expansion of the fluid container without any fluid leakage after inflating the fluid container. The up-down roller controller in the manufacturing apparatus for producing the fluid containers can precisely position the films to firmly form the in-line check valve. Also, the belt conveyer in the manufacturing apparatus helps to form the heat seal portions without creases. As a result, the manufacturing apparatus in the present invention can produce the fluid containers of high reliability and low cost.

BRIEF DESCRIPTION OF THE DRAWINGS

FIGS. 1B-1C are schematic diagrams showing examples of apparatus for producing the fluid containers in the conventional technology.

FIG. 3 is a schematic diagram showing an example of a fluid container having a bonding structure of check valves in the present invention.

FIGS. 4A-4B are schematic diagrams showing an example of a bonding structure of the check-valve in the present invention in more detail.

DETAILED DESCRIPTION OF THE INVENTION

Figure 1A:
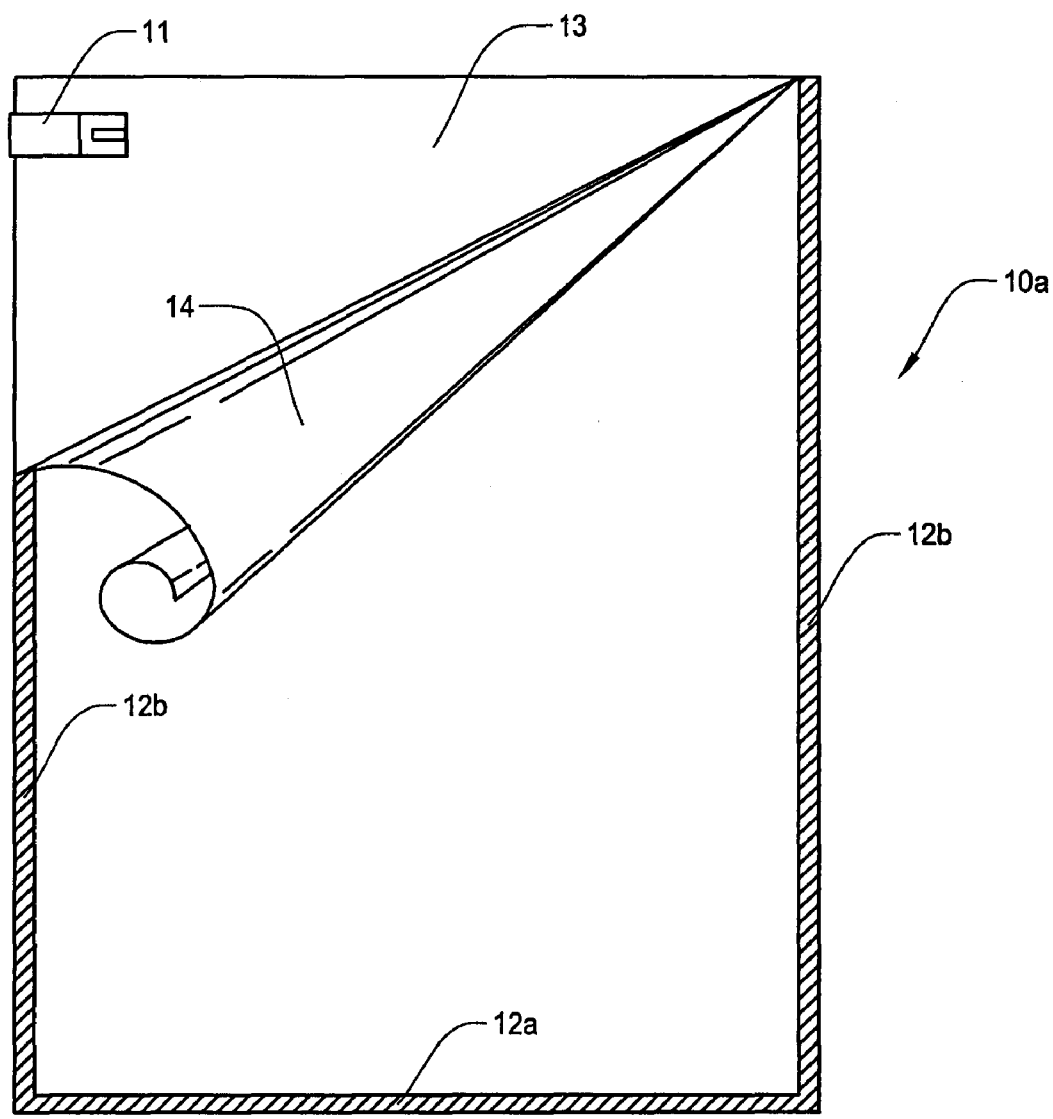
FIG. 1A is a schematic diagram showing an example of a typical fluid container in the conventional technology.
Figure 2A:
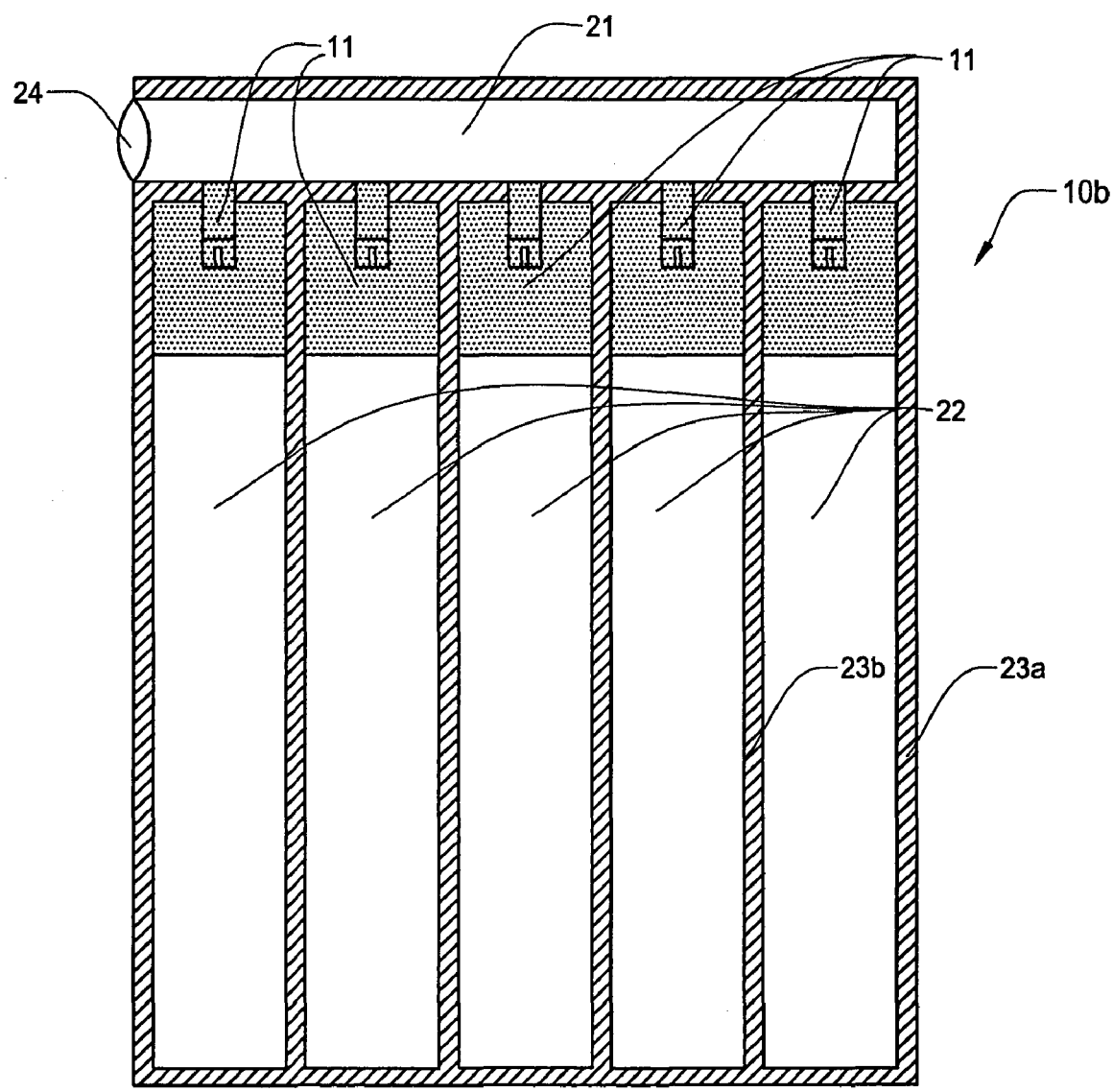
FIGS. 2A-2E are schematic diagrams showing a structure of a fluid container having multiple container members with use of check valves in the conventional technology for explaining the problems involved therein.
Figure 2B:
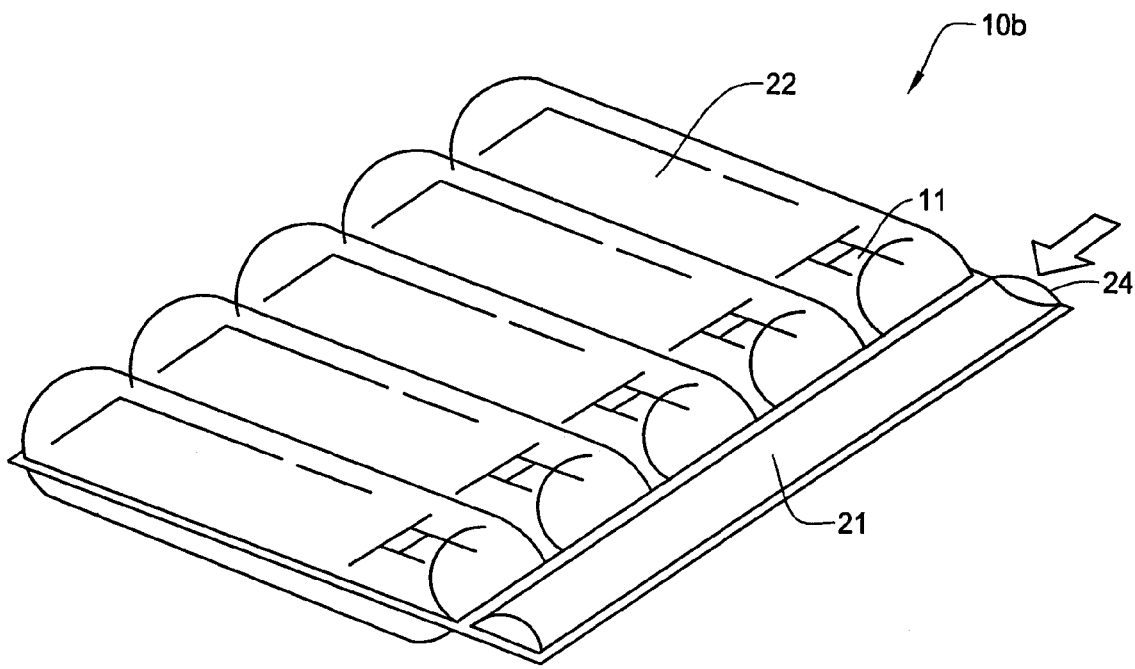
Figure 2C:
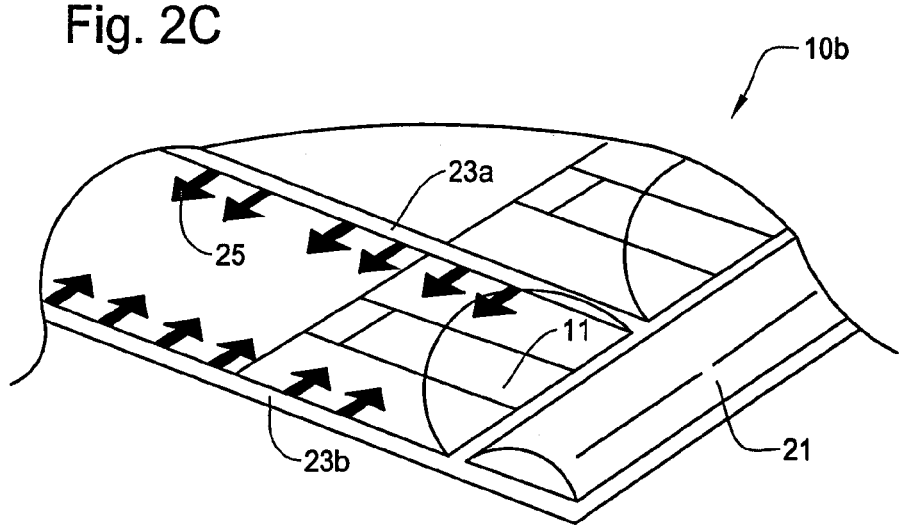
Figure 2D:
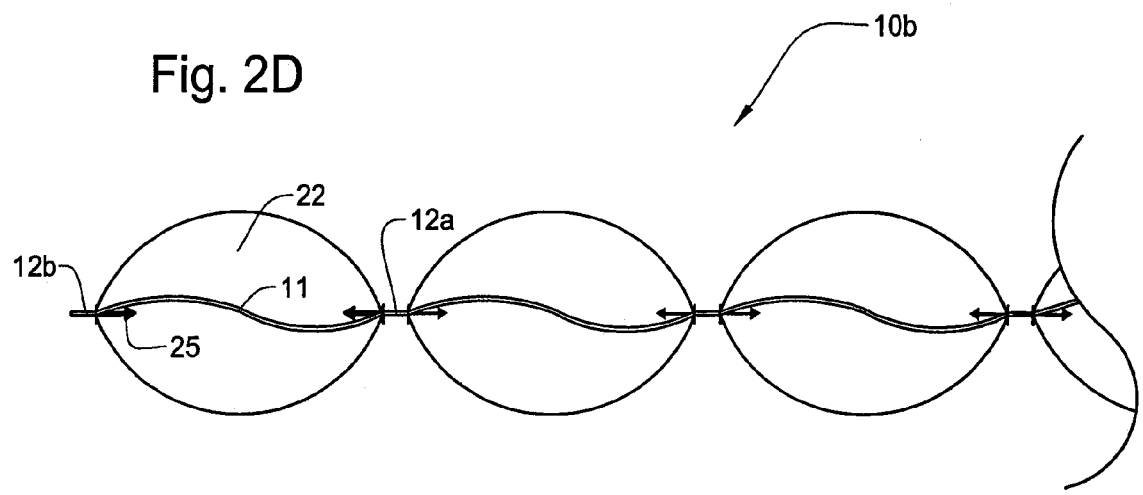
Figure 2E:
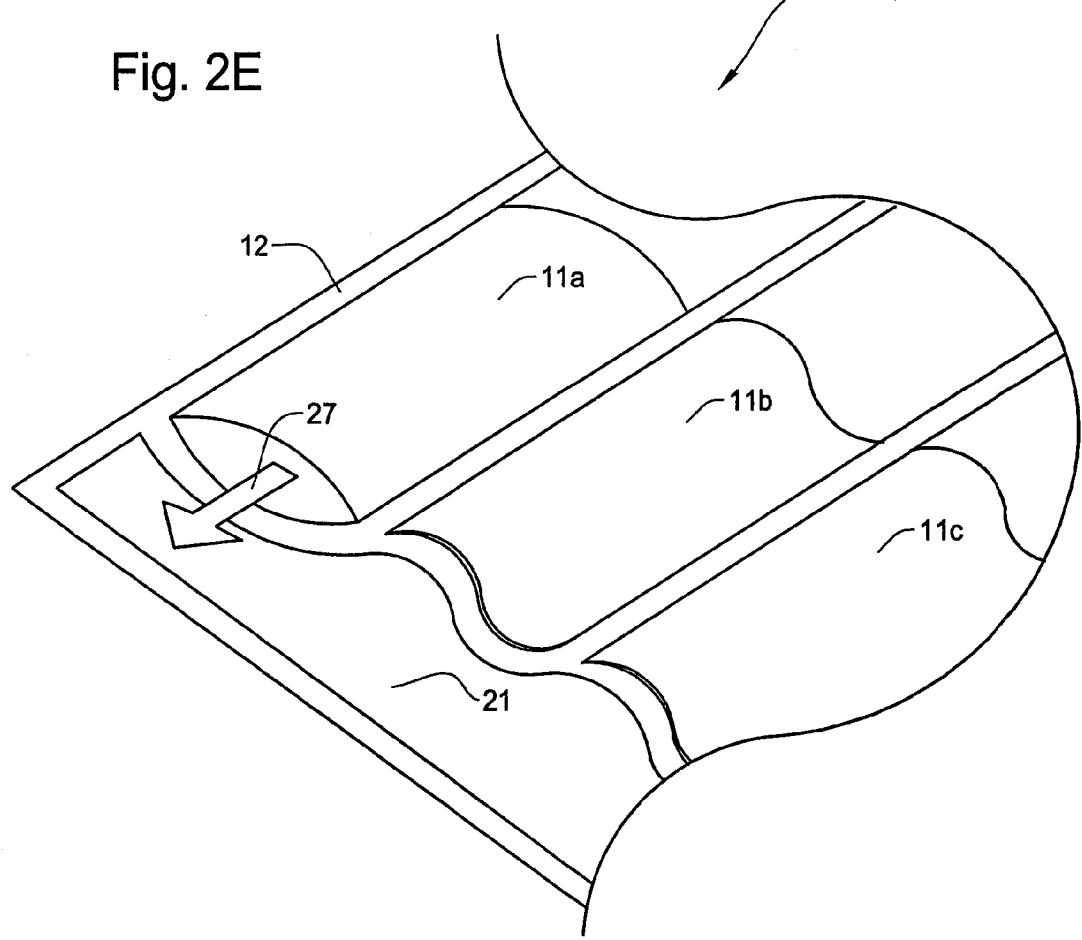

The present invention provides a method and apparatus for producing a fluid container with a reliable structure of check valve. As mentioned in the background of the invention, the check valves for the fluid container in the conventional technology are not reliable when the container is inflated. As shown in FIG. 2D, the sealed portions of the check valve are pressed inwardly and the check valve body becomes wavy. As a result, the fluid pipe in the check valve to prevent the reverse flow is easily opened, thereby causing the leakage. Also, the check valve needs to be attached more accurately to the fluid container.

A check valve in the present invention is designed to solve these problems. To avoid the check valve becoming wavy, the check valve is not bonded to both container plastic films, but bonded to only one of the container plastic films. Also, to increase the accuracy of attaching check valves to the container members, a check valve having a special structure is used for the fluid container in the present invention. Here, it should be noted that the term "fluid" includes gas and liquid, although sometimes may be referred to as an "air" for simplicity.

Now, the present invention is described in detail with reference to the accompanying drawings. FIG. 3 shows an example of structure of a fluid container 30 in the present invention. In this example, the width W of the fluid container 30 is constant. The fluid container 30 is made of four thermoplastic films; two container films 31a-31b and two check valve films 32a-32b. The two container films 31a-31b are used to form an overall fluid container, and the two check valve films 32a-32b are used to form in-line check valves 38 in the manufacturing process.

Figure 7A:
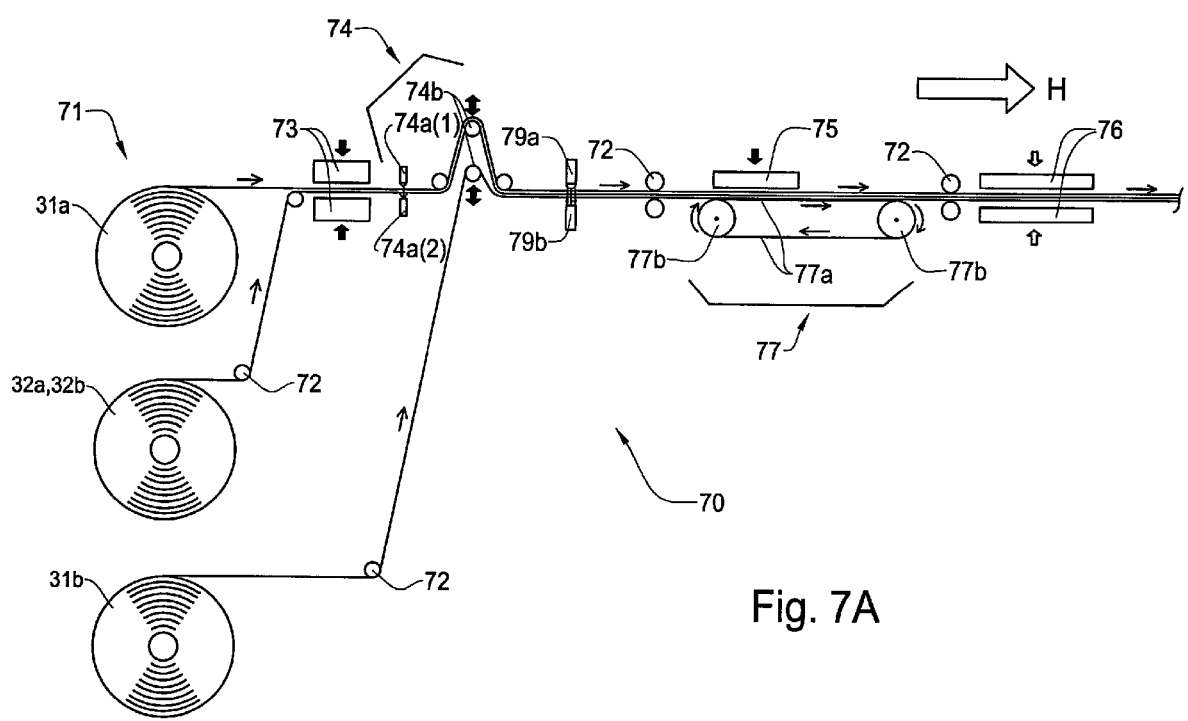
FIG. 7A is a schematic diagram showing an apparatus for producing the fluid containers having the bonding structure of the check valve in the present invention.

These films are supplied respectively by the rolled film stocks 31a, 31b and 32a-32b such as shown in FIG. 7A. The four films are juxtaposed (laminated) in the order of the first container film 31a, first valve film 32b, second valve film 32a and second container film 31b as shown in FIG. 3. Then, through three stages of the manufacturing process, the four films 31a, 31b and 32a-32b are bonded (typically heat-sealed) together to make a plurality of container members 34, a guide passage 33, and check valves 38.

In this example, the fluid (ex., air) is introduced through the guide passage 33 and supplied to each container member 34, through each check valve 38. As another optional embodiment of the present invention, the fluid can be directly supplied to each container member 34 through the corresponding check valve 38 without the guide passage 33. It should be noted that the four elongated plastic films 31a-31b and 32a-32b are fed in a manufacturing flow direction indicated by an arrow H of FIG. 3.

The container members 34 are rectangularly partitioned by upper-lower seal (bonded) portions 39a and right-left seal portions 39b. These container members 34 are formed so that they are inflated in a direction vertical with the manufacturing flow direction H. Further, ordinarily, many container members 34 are formed which are aligned in the flow direction H. Although, in this example, the shape of the container member is rectangular, it is not limited to the rectangular and could be any shape which satisfies the customer's specific needs. Also, although the fluid container having multiple container members are shown, it could be composed of a single container member.

In this example, the check-valve inlet 33a is open to the guide passage 33, and the container member 34 is heat-sealed by the upper-lower and right-left seal portions 39a and 39b. Thus, each container member 34 is independent from one another except for the guide passage 33. In this configuration, the fluid can be supplied to inflate the container members 34 through the guide passage 33 and the check valve inlet 33a.

FIGS. 4A and 4B show the structure of the check valve 38 of the present invention in more detail where FIG. 4A is a top view and FIG. 4B is a cross sectional view. FIG. 4B shows the cross sectional view of the check valve 38 taken along the line II in FIG. 4A. Further, the cross sectional view of FIG. 4B shows the case where the fluid is not supplied to the container member 34.

In FIGS. 4A and 4B, reinforcing seal portions 42 are formed near the check valve inlet 33a. These portions are placed in a manner of contacting each edge of the inlet portion 33a as shown in FIG. 4A. The seal portions 42 reinforce a boundary between the guide passage 33 and the container member 34, and prevent the container member 34 from a rupture or other damage when it is inflated. In the present invention, the reinforcing seal portions 42 is not essential and can be omitted.

In the fluid container 30, the two check valve films 32a and 32b are juxtaposed (superposed) and sandwiched between the two container films 31a and 31b near the guide passage 33, and fixing seal portions 41-42, 35 and 37. These fixing seal portions 41-42 are referred to as outlet portions, the fixing seal portion 35 is referred to as an extended (or widened) portion, and the fixing seal portion 37 is referred to as a narrow down portion. These fixing seal portions also form the structure of the check valve 38 and fix the valve to the first container plastic film 31a at the same time. The fixing seal portions 35 are made by fusing the check valve plastic films 32a and 32b only with the first plastic container film 31a. As a result of this bonding, the check valve 38 is constructed inside the container member 34.

As has been described, the check valve 38 is made of the two flexible thermoplastic films 31a-31b and a fluid pipe 48 is created between the first check valve film 32b and the second check valve film 32a. How the fluid passes through the check valve 38 is shown by white arrows indicated by the numbers 47a, 47b and 47c. The fluid is supplied from the guide passage 33 through the fluid pipe 48 to the container member 34.

Figure 5:
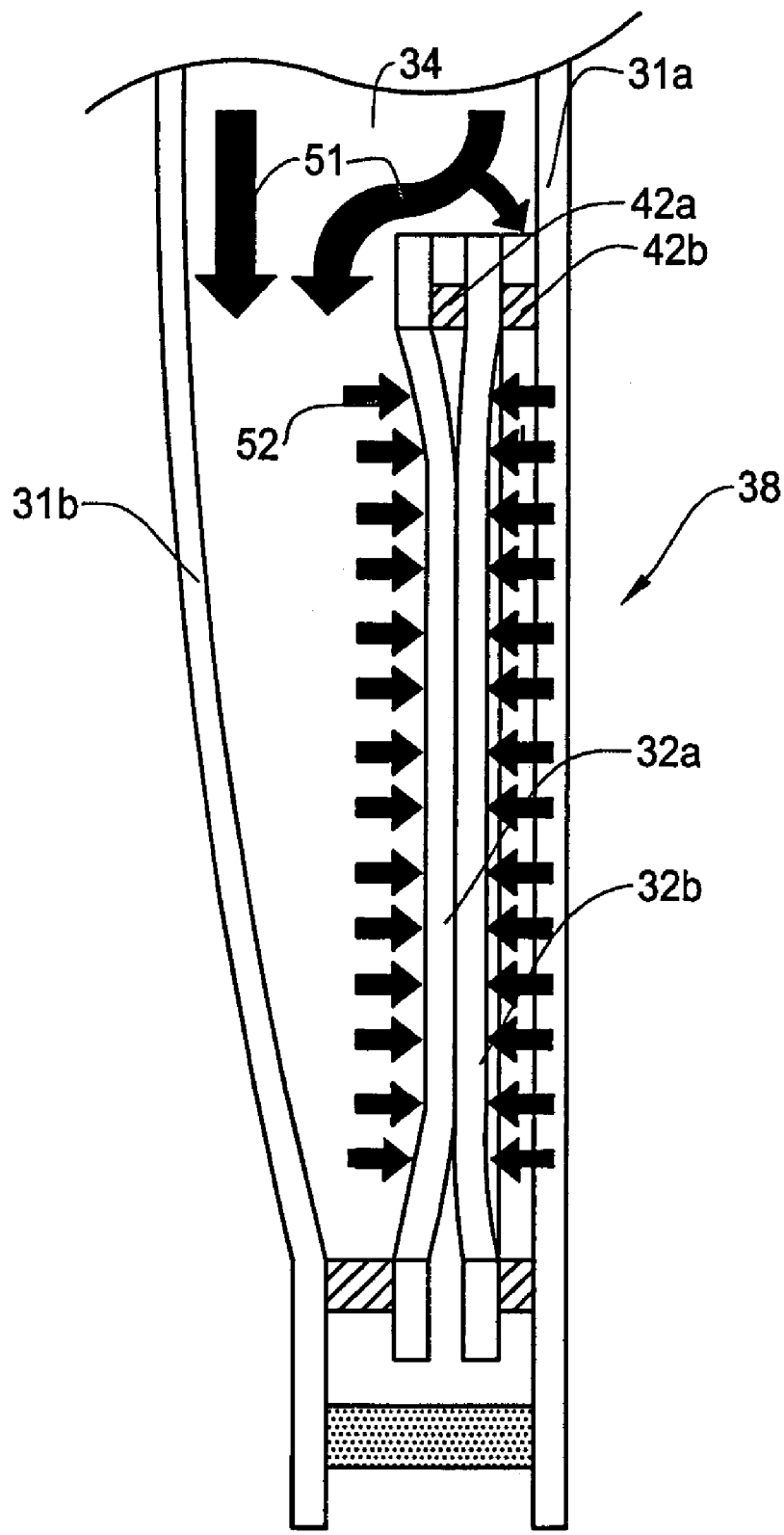
FIG. 5 is a schematic diagram showing the cross sectional view of the check valve of the present invention for explaining how the two check valve films in pairs are tightly closed when the reverse flow happens.

In the check valve 38, the regular fluid relatively easily flows through the fluid pipe 48 although there exist the fixing seal portions 35, 37 and 41-42. However, the reverse flow in the valve will not easily pass through the fluid pipe 48. In other words, if the reverse flow occurs in the fluid pipe 48, it is prevented because of a pressure of the reverse flow itself. By this pressure, the two surfaces of check valve films 32a and 32b which face each other, are brought into intimate contact such as shown in FIG. 5 as will be explained later.

As has been described, in FIGS. 4A-4B, the fixing seal portions 35, 37 and 41-42 also work for guiding the fluid to flow in the check valve 38. The fixing seal portions are comprised of the portions 41a, 42a, 35a and 37a which bond the two check-valve films 32a and 32b together, and the portions 41b, 42b, 35b and 37b which bond the first container film 31a and the first check valve film 32b together. Accordingly, the fluid pipe 48 in the check valve 38 is created as a space formed between the two check valve films 32a-32b which excludes the fixing seal portions 41a, 42a, 35a and 37a.

Further in FIG. 4A, the fixing seal portions 37 are composed of two symmetric line segments (narrow down portions) extended in an upward direction of the drawing, and a width of the fluid pipe 48 is narrowed down by these portions 37. In other words, the regular flow can easily pass through the fluid pipe to the container member 34 when it passes through the wide space to the narrow space created by the narrow down (fixing seal) portions 37. On the other hand, the narrow down portions 37 tend to stop the reverse flow from the container member 34 when the fluid goes back through the narrow space created by the narrow down portions 37.

The extended portion 35 is formed next to the narrow down portions 37. The shape of the extended portion 35 is similar to a heart (triangular) shape to make the fluid flow divert. In this embodiment example, a pointed portion of the extended portion 35 is located near the exit of the narrow down portion 37. By passing the fluid through the extended portion 35, the fluid diverts, and the fluid flows around the edge of the extended portion 35 (indicated by the arrow 47b). When the fluid enters the container member 34 (forward flow), the fluid flows naturally in the extended portion 35. On the other hand, the reverse flow cannot directly flow through the narrow down portions 37 because the reverse flow hits the extended portion 35 and is diverted its direction. Thus, the reverse flow cannot practically occur because the flow is not natural. Therefore, the extended portion 35 also functions to prevent the reverse flow.

The outlet portions 41-42 are formed next to the extended portion 35. In this example, the outlet portion 41, extended in perpendicular to the (manufacturing) flow direction H, is formed at the upper center of the check valve 38, and the two outlet portions 42 extended to the (manufacturing) flow direction H are placed symmetrically with respect to the outlet portion 41. There are several spaces among these outlet portions 41 and 42. These spaces constitute a part of the fluid pipe through which the fluid can pass as indicated by the arrows 47c. The outlet portions 41-42 are formed as a final passing portion of the check valve 38 when the fluid is supplied to the container member 34 and the fluid diverts in four ways by passing through the outlet portions 41-42.

Accordingly, the reverse flow from the container member 34 cannot easily pass through the fluid pipe 48. Thus, the reverse flow is stopped in some degrees by the outlet portions. As has been described, the fluid passing from the guide passage 33 to the container member 34 is relatively smoothly propagated through the check valve 38. Further, the narrow down portions 37, extended portions 35 and outlet portions 41-42 formed in the check valve 38 work to prevent the reverse flow.

FIG. 5 is a cross sectional view showing an effect of the check valve 38 of the present invention. This example shows an inner condition of the check valve 38 when the reverse flow tries to occur in the container member 34. First, the fluid hardly enters in the fluid pipe 48 because the outlet portions 41 and 42 work for the fluid such that the reverse flow will not easily enter in the outlet portions. Instead, the fluid flows in a space between the second container film 31b and the second valve film 32a such as indicated by the arrows 51, and the space is inflated such as shown in FIG. 5. By this expansion, the second check valve film 32a is pressed to right, and at the same time, the first valve film 32b is pressed to left. As a result, the two check valve films 32a and 32b are brought into tight contact as indicated with the arrows 52. Thus, the reverse flow is completely prevented.

Figure 6A:
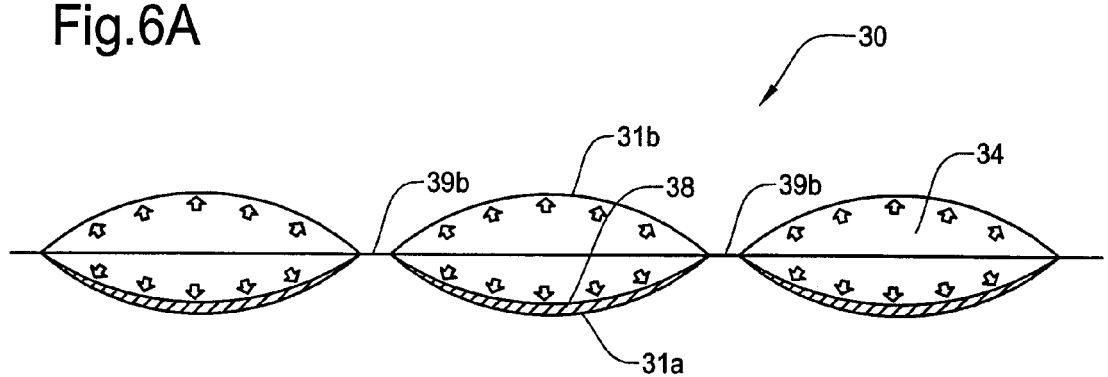
FIGS. 6A-6B are schematic diagrams showing the cross sectional view of the check valve of the present invention when the fluid container is inflated.
Figure 6B:
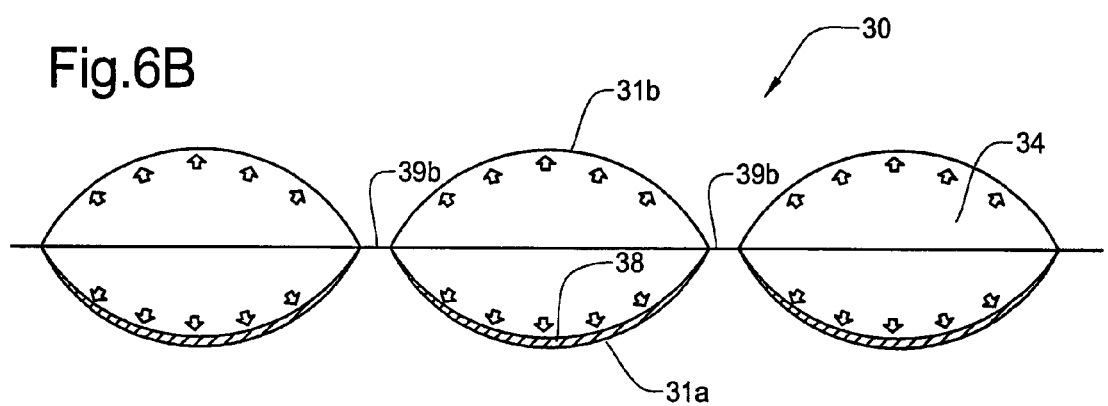

FIGS. 6A-6B are simplified cross sectional drawings of the check valve 38 viewed from the guide passage of the fluid container 30. FIG. 6A shows the condition that the container members are inflated until about a half of the full inflation. FIG. 6B shows the condition that the container members 34 are inflated fully by the fluid. The first and second container films 31a and 31b are inflated such as shown in FIGS. 6A-6B, and the check valve 38 is shown by the cross hatching on the first container film 31a.

Each container member 34 is chained by the right-left seal portions 39b. Because the narrow down portions 37, extended portion 35 and outlet portions 41-42 in FIGS. 4B-4C are placed closely, their bonding force with the first container film 31a is strong enough to keep fixing the check valve 38 to the film 31a even if the container member 34 is fully inflated. Therefore, the check valves 38 bonded only to the first container film 31a are curved along the surface deflection of the first container film 31a.

In other words, both the two check-valve films forming the check valve 38 are curved in the same direction as that of the first container film 31a (the fluid pipe in the check-valve keeps closing) while tightly contacting with one another. Thus, FIGS. 6A-6B clearly show that the design of the check valves bonded only to one of the container films can effectively prevent the check valve 38 from leaking when the container member 34 is inflated. As shown in FIG. 5, since the check valve 38 is tightly closed when the reverse flow is about to occur, the reverse flow of the fluid is effectively prevented by the structure of the check valve in the present invention.

Next, the manufacturing process and apparatus for producing the fluid container are described with reference to FIGS. 7A-7C and 8A-8C. FIG. 7A shows an example of a preferred embodiment of a manufacturing apparatus for the fluid container in the present invention. As has been described, the check valves are constructed during the manufacturing process of the fluid containers.

The manufacturing apparatus 70 is comprised of a film feeding means 71, film conveying rollers 72, a valve heat seal device 73, an up-down roller controller 74, a sensor 79 for feeding elongated plastic films, a right-left heat seal (bonding) device 75, a belt conveyer 77 for right-left heat seal, and an upper-lower heat seal (bonding) device 76.

The up-down roller controller 74 is provided to the manufacturing apparatus 70 in order to improve a positioning performance of the check valves. The up-down controller 74 moves the rollers 74b in perpendicular (upward or downward) to the manufacturing flow direction H in order to precisely adjust a position of the check valve. Also, the belt conveyer 77 is provided to the manufacturing apparatus 70 in order to improve a heat seal performance for forming right-left heat seal portions 39*b* shown in FIG. 3.

With reference to FIG. 7A, an overall manufacturing process is described. First, the film feeding means 71 supplies elongated check valve films 32*a* and 32*b* which are juxtaposed (superposed) with each other, and the container films 31*a* and 31*b* to the following stages of the manufacturing process. The film conveying rollers 72 at various positions in the manufacturing apparatus 70 guide and send each film forward.

Every time each elongated film is advanced by a length equal to one fluid container in the manufacturing flow direction, heat seal processes are performed at the three stages of the process. The first stage of heat sealing process is done by using the valve heat seal device 73. This is the process for forming the structure of in-line valve 38. The position of the valve 38 is precisely adjusted by the up-down roller controller 74. The detailed method will be explained later with reference to FIGS. 7B-7C.

The second stage of the heat sealing process is done by using the right-left heat seal device 75 and the belt conveyer 77 for creating the right-left heat seal portions. The belt conveyer 77 is used for preventing the right-left heat seal portion from extending or being damaged. The belt conveyer 77 has two wheels 77*b* and a flexible rubber belt 77*a* which temporarily sticks to the film 31*b* and moves at the same feed speed of the films. Therefore, the belt conveyer 77 keeps the films as is until the seal portion passes the end of the conveyer 77. Also, the heat seal portions with a high temperature are naturally cured while they are temporarily stuck to the rubber belt 77*a*. As a result, the belt conveyer prevents the right-left seal portions 39*b* extended or crinkled.

The third stage of the sealing process is performed by the upper-lower heat seal device 76 for creating the upper-lower heat seal portions. This is the final heat seal process to produce the fluid container 30. The fluid containers which are produced in the form of one long sheet may be rolled again, or may be cut and heat-sealed again to make a sack-like form for a cushion of package. Processes of inflating the produced fluid container and packaging the products with the fluid container may be added.

Figure 7B:
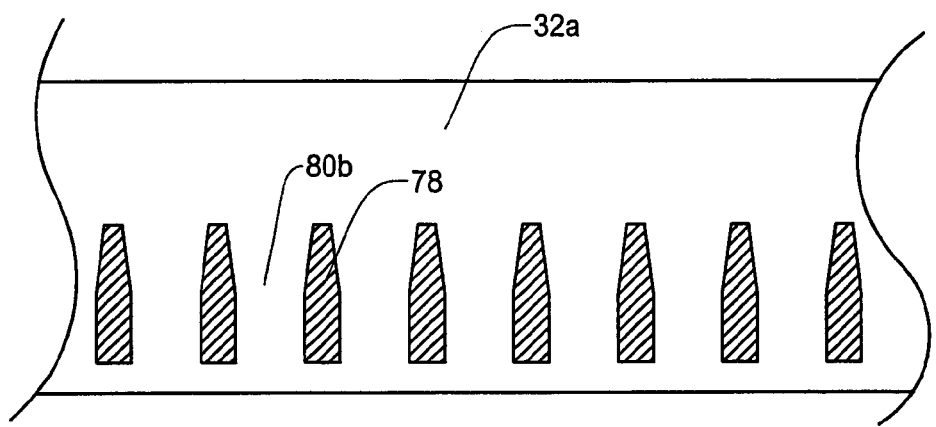
FIGS. 7B and 7C are schematic diagrams showing a relationship between a mark on the check valve film and the scanning area of the sensor.

The control processes for supplying the films in the manufacturing machine 70 are described with reference to FIGS. 7A-7C. Feeding of the elongated films 31*a*-31*b*, 32*a* and 32*b* is controlled by using the sensor 79 and the film conveying rollers 72. The sensor 79 is comprised of, for example, a light emitting diode (LED) 79*a* and a photo-receiver 79*b* for sensing the light from the LED. The sensor 79 detects an edge between a transparent part 80*b* and a mark 78 which is printed in advance on one of the check valve films 32*a* and 32*b* such as shown in FIG. 7B. The sensor 79 causes to drive the film conveying rollers 72 such that each of the elongated plastic films 31*a*, 31*b*, 32*a* and 32*b* in the size of one fluid container move forward. Thus, the manufacturing apparatus 70 includes a main controller for controlling the overall feeding process of the elongated films 31*a*, 31*b*, 32*a* and 32*b* based on the signals from the sensor 79.

The manufacturing apparatus 70 also includes a precise control means for precisely positioning the check valves to a position of the printed mark 78 (in FIG. 7B) by using the up-down roller controller 74 shown in FIGS. 7A. The up-down roller controller 74 is configured by a sensor 74*a* and an up-down roller 74*b*. The films are typically transparent and the marks 78 are painted with an appropriate color such as white. The sensor 74*a* is comprised of, for example, a light emitting diode (LED) 74*a*(1) and a photo-receiver 74*a*(2) for detecting the light from the LED.

The LED 74*a*(1) emits a light which passes through the films 31*a* and 32*a*-32*b* as indicated by the arrow in FIG. 7A. If the light passes through the transparent part 80*a* of the film 32*a*, then an energy of the light received by the photo-receiver 74*a*(2) will be large. When the light passes through the white mark 78, the detected light will be small because the light cannot easily pass through the white paint. Therefore, the sensor 74*a* can distinguish the transparent part 80*b* from the white mark 78.

Figure 7C:
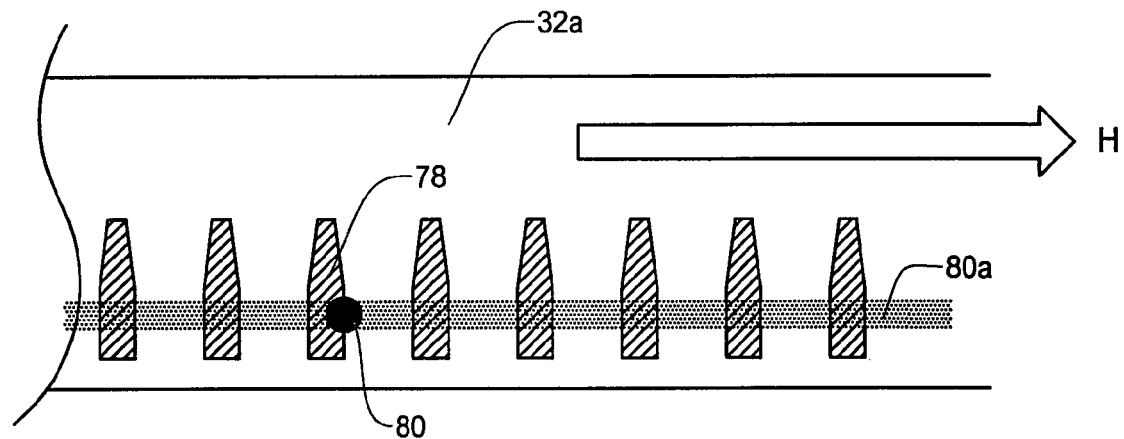

By using this information, the manufacturing apparatus 70 controls the position of the valve films 32 by driving the up-down rollers 74*b* in perpendicular (upward or downward) to the manufacturing flow direction H such that the light of the LED passes through the edge 80 after the films are supplied in the manufacturing flow direction H such as shown in FIG. 7C. In other words, the films always have some tension in the flow direction H. Therefore, if the up-down controller moves the up-down rollers 74*b* upward, then the films are fed forward. In contrast, if the controller moves them downward, then the films are fed backward. In this manner, the position of the films are controlled. In FIG. 7C, the shadowed area 80*a* shows an area scanned by the sensor 74*a* while the elongated films 32*a* are sent in the direction H.

With reference to FIGS. 7A and 8A-8C, the three stages of the heat seal process is described in detail. In general, the heat seal device in each stage 73, 75 and 76 includes heaters and a stamping die which forms the heat seal portions required in the stage. Each die is heated and maintained at a predetermined temperature to appropriately fuse and bond the films together.

Figure 8A:
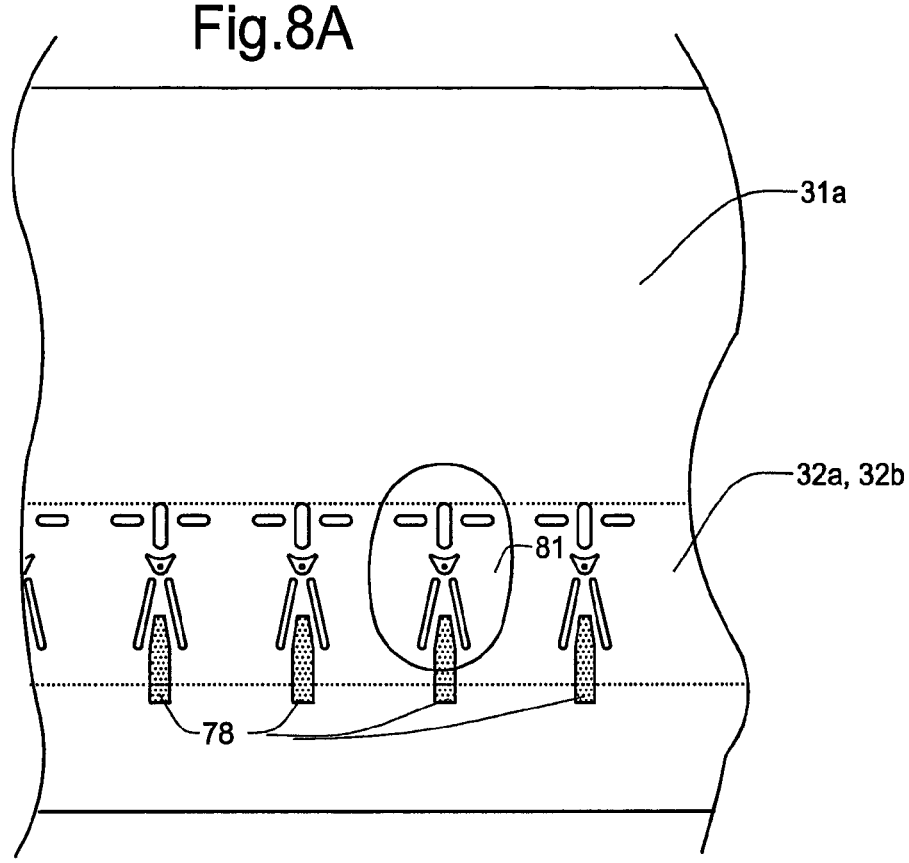
FIGS. 8A-8C are schematic diagrams showing bonding processes to produce the fluid containers including the in-line check valves in the present invention.
Figure 8B:
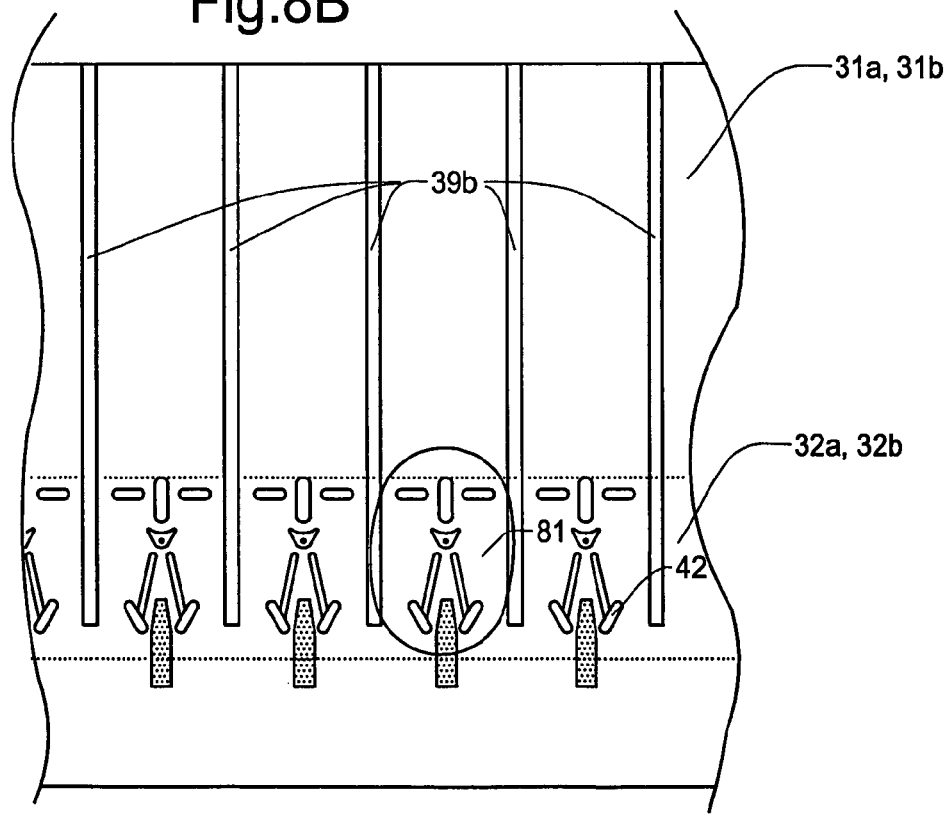

The first container film 31*a* and the check valve films 32*a* and 32*b* are superposed and heat-sealed by the valve heat seal devices 73, as shown in FIG. 8A. The heat seal device includes the heaters and the stamping die, which forms the fixing seal portions 81. Here, the fixing seal portions 81 correspond to the fixing seal portions 35, 37 and 41-42 in FIGS. 4A-4B. As has been described, the color marks 78 are used to control the position of the container films 31*a* and the check valve films 32*a*-32*b* such that the fixing portions are formed in the center of the color mark 78. By forming the fixing seal portions 81, the check-valve 38 can be created which is fixed to the first container film such as shown in FIG. 6B.

On the second stage of the heat sealing process (at the right-left heat seal device 75 and the belt conveyer 77), the right-left heat seal portions 39*b* are formed by further superposing the container film 31*b* and heat-sealing the films 31*a*-31*b* and 32*a*-32*b*. The right-left heat seal device 75 includes heaters and a stamping die to form the shape of the right-left heat seal portions 39*b*. The fixing portion 42 of the check valve is heat-sealed as needed in this process. As has been described, this heat seal process uses the belt conveyer 77 in FIG. 7A which is provided to form the right-left seal portions 39*b* without creases or wrinkles.

On the third stage of the heat sealing process (at the upper-lower heat seal device 76), the upper-lower heat seal portions 39*a* (indicated by the shadow area in FIG. 8C) are formed by heat-sealing the films 31*a*-31*b* and 32*a*-32*b*. The upper-lower heat seal device 76 includes heaters and a stamping die to form the shape of the upper-lower heat seal portions 39*a*. Through the above three stages of the heat sealing process, the fluid container members 34, the inlet portions 33*a*, the guide passage 33 and the fixing seal portions (in-line valve) 81 are created, and the production of the fluid containers is completed.

Figure 8C:
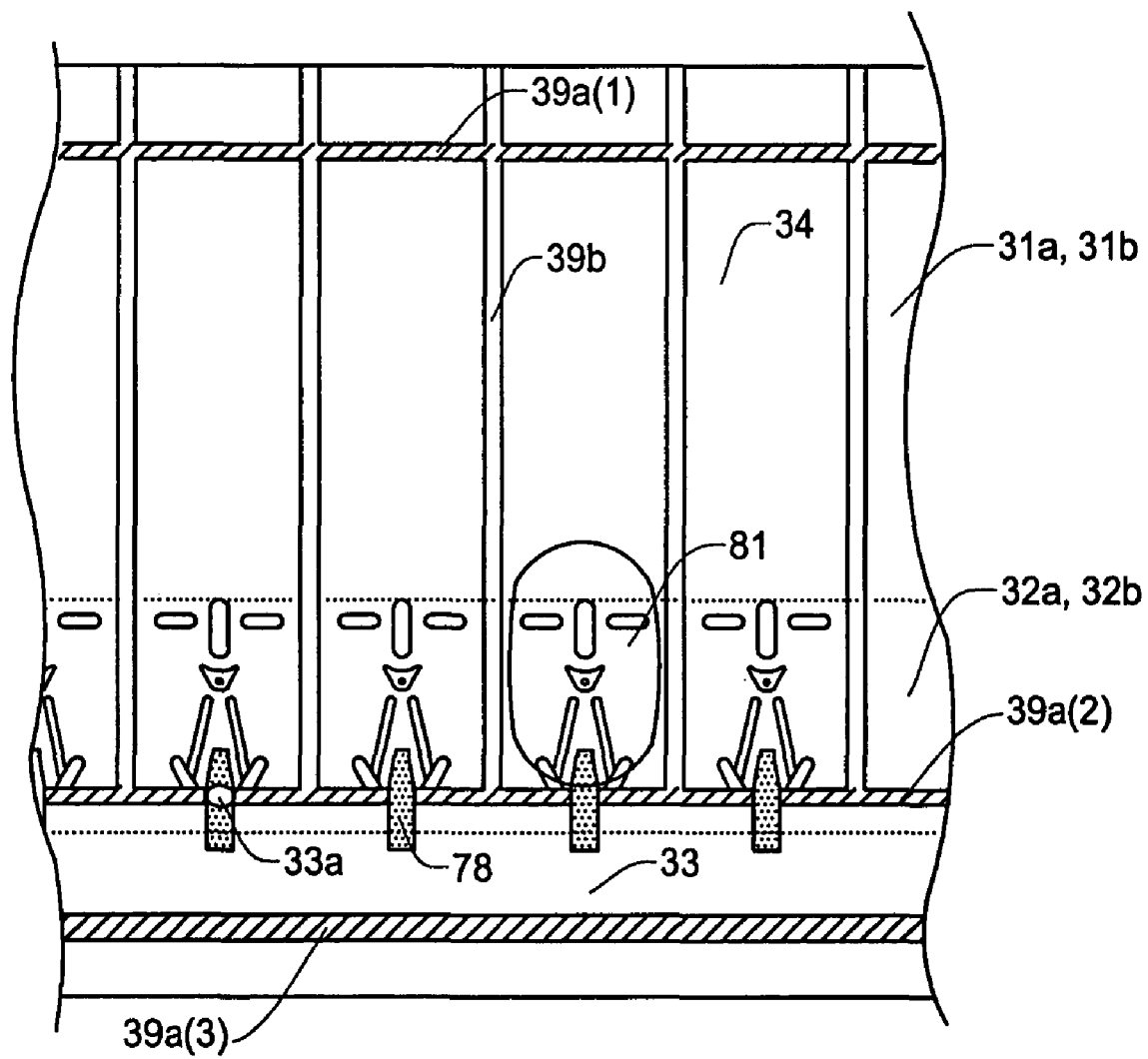

As shown in FIG. 8C, the inlet portion 33*a* are covered by the mark 78. Therefore, if heat-resistant paint is optionally used for printing the mark 78, the inlet portion 33*a* of the valve 38 will not be bonded together even if the inlet portion 33*a* tries to be heat-sealed with other portions. In this case, the cavity of the inlet portion 33*a* in the stamping die to create the inlet portion is not necessary. Thus, the design of the stamping die becomes simpler if the heat-resistant paint is used.

Figure 9A:
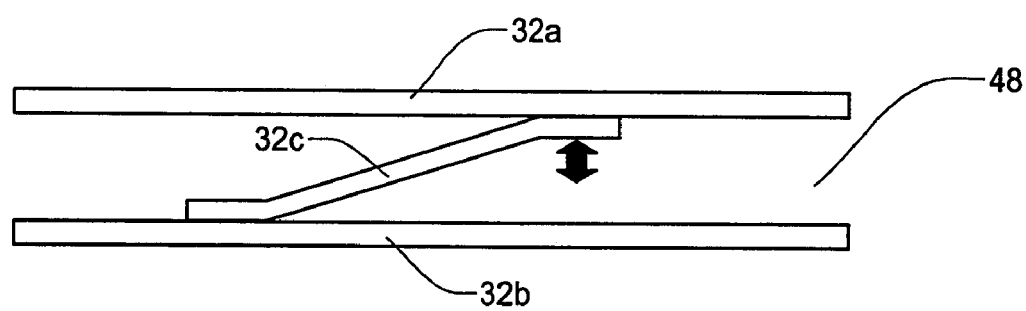
FIGS. 9A-9B are schematic diagrams showing cross sectional view of other embodiments of the check valve structure in the present invention.

The present invention is not limited to the embodiments mentioned above. For example, in the above example, the two check valve films 32*a* and 32*b* are used. However, instead of using the two check valve films, one check valve film may be used for the same structure by folding it in two. Also, more than two check valve films may be used for the similar purpose. For example, as shown in FIG. 9A, an additional check valve 32*c* is placed between check valve films 32*a* and 32*b*. The additional check valve film 32*c* is bonded to one of the check valve films (in this example, film 32*b*) and can be brought into tight contact or opened to another check valve film (in this example, film 32*a*) in order to prevent the reverse flow in the fluid pipe.

Figure 9B:
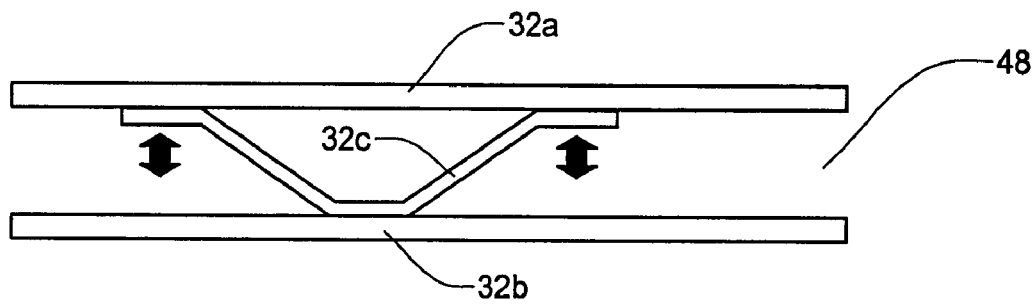

Further, the shape of the check valve film 32*c* is not limited to a particular shape to work for only one check valve sheet such as shown in FIG. 9A. It may be a "V" shape to operate as a check valve for both directions such as shown in FIG. 9B. Further, as other embodiments of the present invention, such a configuration in which a plurality of the check valve films 32*c* are placed between the check valves 32*a* and 32*b* is also possible.

As has been in the foregoing, the structure of check valves to be bonded to the fluid container and the production apparatus for producing the fluid containers enable the fluid container of reliably keeping the expansion of the fluid container without any fluid leakage after inflating the fluid container. The up-down roller controller in the manufacturing apparatus for producing the fluid containers can precisely position the films to firmly form the in-line check valve. Also, the belt conveyer in the manufacturing apparatus helps to form the heat seal portions without creases. As a result, the manufacturing apparatus in the present invention can produce the fluid containers of high reliability and low cost.

Although the invention is described herein with reference to the preferred embodiments, one skilled in the art will readily appreciate that various modifications and variations may be made without departing from the spirit and the scope of the present invention. Such modifications and variations are considered to be within the purview and scope of the appended claims and their equivalents.

What is claimed is:

1. A fluid container for packaging, comprising:
   a plurality of container members formed by a first container film and a second container film superposed and bonded with each other at predetermined portions of the first and second container films; and
   a plurality of check valves, each check valve formed by bonding a first and a second check valve films positioned between the first and second container films, the check valve being fixed to the first container film, the check valve including:
      a fluid pipe for supplying the fluid from a common guide passage to the container members,
      wherein the first and second check valve films are bonded to the first container film, and direct bonding portions where the first and second check valve films are directly bonded to the first container film include:
         a pair of converging direct-bonding portions forming a fluid passage that gradually narrows toward a predetermined direction of a fluid flow, and being connected to the common guide passage to receive the fluid; and
         a first island downstream of the fluid passage for dividing the fluid flow within the fluid passage.

2. The fluid container of claim 1 wherein a plurality of marks are printed on at least one of the first check valve film and the second check valve film to determine a position of the check valve on the first container film, where the marks indicate predetermined locations of the fluid container.

3. The fluid container of claim 1 wherein reinforcing bonded portions are formed near the common guide passage to reinforce the bonding between the check valve and the first container film.

4. The fluid container of claim 2 wherein the plurality of the marks are printed with use of heat-resistant paint.

5. The fluid container of claim 1, wherein the check valve films and the second container film establish a space for containing fluid between the check valve films and the second container film.

6. The fluid container of claim 1, wherein the check valve further includes at least one second island in the fluid passage downstream of the first island.

7. The fluid container of claim 6, wherein the at least one second island includes at least one portion arranged substantially perpendicular to the predetermined direction of the fluid flow.

8. A fluid container for packaging, comprising:
   a plurality of container members formed by a first container film and a second container film superposed and bonded with each other; and
   a plurality of check valves in fluid communication with a common guide passage and the container members, each check valve having portions directly bonded to the first container film or the second container film, the direct-bonding portions where the check valve is directly bonded to the first container film or the second container film including two converging direct-bonding portions defining a narrow down passage, and an island downstream of the narrow down passage for dividing a fluid flow from the narrow down passage.

9. The fluid container of claim 8, wherein
   the narrow down passage including a fluid passage that gradually narrows toward a predetermined direction of a fluid flow, and being connected to the common guide passage to receive the fluid.

10. The fluid container of claim 9 wherein reinforcing bonded portions are formed near the common guide passage to reinforce the bonding between the check valve and one of the first or second container film.

11. The fluid container of claim 8, wherein the check valve includes at least one check valve film, which continuously extends through a same length as of the first container film.

* * * * *